(12) United States Patent
Han

(10) Patent No.: US 11,523,523 B2
(45) Date of Patent: Dec. 6, 2022

(54) BENDABLE SUPPORTING STRUCTURE AND DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventor: Wen Han, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 142 days.

(21) Appl. No.: 16/772,812

(22) PCT Filed: Dec. 23, 2019

(86) PCT No.: PCT/CN2019/127302
§ 371 (c)(1),
(2) Date: Jun. 15, 2020

(87) PCT Pub. No.: WO2021/077593
PCT Pub. Date: Apr. 29, 2021

(65) Prior Publication Data
US 2022/0132679 A1    Apr. 28, 2022

(30) Foreign Application Priority Data
Oct. 23, 2019 (CN) .......................... 201911013180.6

(51) Int. Cl.
*G06F 1/16* (2006.01)
*H05K 5/00* (2006.01)
*E05D 1/00* (2006.01)

(52) U.S. Cl.
CPC ............. *H05K 5/0017* (2013.01); *E05D 1/00* (2013.01); *E05Y 2900/606* (2013.01)

(58) Field of Classification Search
CPC ............................ G06F 1/1616; G06F 1/1652
See application file for complete search history.

(56) References Cited

U.S. PATENT DOCUMENTS 10,069,107 B2 * 9/2018 Jeon ..................... H01L 51/0097
10,599,184 B2    3/2020 Kim et al.
(Continued)

FOREIGN PATENT DOCUMENTS

CN    106255935 A    12/2016
CN    206210301 U    5/2017
(Continued)

*Primary Examiner* — Anthony Q Edwards
(74) *Attorney, Agent, or Firm* — PV IP PC; Wei Te Chung; Ude Lu

(57) ABSTRACT

The present disclosure provides a bendable support structure and a flexible display device. The supporting structure includes a flexible substrate. The flexible substrate includes a bendable region, transition regions and non-bendable regions. The non-bendable regions are disposed on opposite sides of the bendable region. The bendable regions are connected to each of the non-bendable regions through one of the transition regions. First supporting units are fixedly disposed on each of the non-bendable regions. Second supporting units are disposed on each of the transition regions and connected to the first supporting units. A thickness of the second supporting unit gradually decrease from an end close to the non-bendable region to an end close to the bendable region.

16 Claims, 2 Drawing Sheets

(56) References Cited

U.S. PATENT DOCUMENTS

2017/0054106 A1    2/2017  Jeon
2017/0115701 A1*  4/2017  Bae ........................ G06F 1/16
2017/0250355 A1    8/2017  Shirahata et al.
2018/0341293 A1  11/2018  Kim

FOREIGN PATENT DOCUMENTS

| | | |
|---|---|---|
| CN | 106847870 A | 6/2017 |
| CN | 206400960 U | 8/2017 |
| CN | 108962029 A | 12/2018 |
| CN | 109087586 A | 12/2018 |
| CN | 109671718 A | 4/2019 |

* cited by examiner

BENDABLE SUPPORTING STRUCTURE AND DISPLAY DEVICE

FIELD OF INVENTION

The present disclosure relates to a mechanism structure, and more particularly, to a bendable supporting structure and a display device.

BACKGROUND OF INVENTION

As flexible display devices become more and more popular in application market, the folding performance of foldable flexible displays attracts attention.

However, in current foldable flexible displays, supporting structures for supporting flexible display panels are more complicated, the manufacturing processes take time, and the manufacturing cost is higher.

Technical Problems

The present disclosure provides a bendable supporting structure and a display device to solve the technical problem that supporting structures of the flexible display panels are more complicated.

SUMMARY OF INVENTION

The present disclosure provides a bendable supporting structure, comprising:

A flexible substrate, wherein an object to be bent is externally disposed on the flexible substrate, one side of the flexible substrate facing away from the object to be bent comprises a bendable region, two transition regions, and two non-bendable regions, two of the non-bendable region are disposed on opposite sides of the bendable region, and the bendable regions is connected to each of the non-bendable regions through one of the transition regions.

First supporting units fixedly disposed on each of the non-bendable regions.

Second supporting units disposed on each of the transition regions and connected to the first supporting units.

Wherein a thickness of the second supporting unit gradually decreases from an end close to the non-bendable region to an end close to the bendable region.

In the bendable supporting structure of the present disclosure, the second supporting unit comprises a first surface toward to the flexible substrate and a second surface away from the flexible substrate.

Wherein in a flat condition, a plane where the flexible substrate locates is a reference plane, the first surface is parallel to the reference plane and a height of the second surface gradually declines from the end close to the non-bendable region to the end close to the bendable region.

In the bendable supporting structure of the present disclosure, the second supporting units are fixedly connected to the first supporting units, and the second supporting units are suspended.

In the bendable supporting structure of the present disclosure, when the bendable supporting structure is bent, the flexible substrate forms bending structure having a drop shape at the transition regions and the bendable regions, wherein the bending structure comprises transition segments corresponding to the second supporting units and an arc segment connected between the transition segments, and a length of the second supporting units is less than or equal to a length of the transition segments.

In the bendable supporting structure of the present disclosure, the second surface is an inclined surface.

In the bendable supporting structure of the present disclosure, a thickness of the flexible substrate is smaller than a thickness of the first supporting unit.

In the bendable supporting structure of the present disclosure, the thickness of the flexible substrate is 20 microns to 50 microns, and a thickness of the first supporting unit is 8 to 10 times than the thickness of the flexible substrate.

In the bendable supporting structure of the present disclosure, the first supporting unit is connected to the flexible substrate through an adhesive layer.

In the bendable supporting structure of the present disclosure, the first supporting unit and the second supporting unit are integrally formed.

In the bendable supporting structure of the present disclosure, a material of the flexible substrate is selected from one of stainless steel, amorphous metal, or spring steel sheet.

The present disclosure further relates to a display device comprising a flexible display panel and a bendable supporting structure, wherein the flexible display panel is fixedly disposed on the bendable supporting structure, and the bendable supporting structure comprises:

A flexible substrate, wherein an object to be bent is externally disposed on the flexible substrate, one side of the flexible substrate facing away from the object to be bent comprises a bendable region, two transition regions, and two non-bendable regions, two of the non-bendable region are disposed on opposite sides of the bendable region, and the bendable regions is connected to each of the non-bendable regions through one of the transition regions.

First supporting units fixedly disposed on each of the non-bendable regions/

Second supporting units disposed on each of the transition regions and connected to the first supporting units.

Wherein a thickness of the second supporting unit gradually decrease from an end close to the non-bendable region to an end close to the bendable region.

The display device of the present disclosure, the second supporting unit comprises a first surface toward to the flexible substrate and a second surface away from the flexible substrate.

Wherein in a flat condition, a plane where the flexible substrate locates is a reference plane, the first surface is parallel to the reference plane and a height of the second surface gradually declines from the end close to the non-bendable region to the end close to the bendable region.

The display device of the present disclosure, the second supporting units are fixedly connected to the first supporting units, and the second supporting units are suspended.

The display device of the present disclosure, when the bendable supporting structure is bent, the flexible substrate forms bending structure having a drop shape at the transition regions and the bendable regions, wherein the bending structure comprises transition segments corresponding to the second supporting units and an arc segment connected between the transition segments, and a length of the second supporting units is less than or equal to a length of the transition segments.

The display device of the present disclosure, the second surface is an inclined surface.

The display device of the present disclosure, a thickness of the flexible substrate is smaller than a thickness of the first supporting unit.

The display device of the present disclosure, the thickness of the flexible substrate is 20 microns to 50 microns, and a thickness of the first supporting unit is 8 to 10 times than the thickness of the flexible substrate.

The display device of the present disclosure, the first supporting unit is connected to the flexible substrate through an adhesive layer.

The display device of the present disclosure, the first supporting unit and the second supporting unit are integrally formed.

The display device of the present disclosure, a material of the flexible substrate is selected from one of stainless steel, amorphous metal, or spring steel sheet.

Beneficial Effects

The benefit of the bendable supporting structure in the present disclosure is it forms a standard waterdrop-like structure between the bendable region and the transition region when bending the flexible substrate and the object to be bent externally provided on the flexible substrate by setting the thickness of the second supporting unit. Stress concentration and transition out of synchrony caused by the object to be bent and the flexible substrate at the step difference between the first supporting unit and the flexible substrate during bending are prevented.

DESCRIPTION OF DRAWINGS

In order to clarify the technical solutions of embodiments of the present disclosure, drawings required to describe the embodiments are briefly illustrated. Obviously, the mentioned embodiments are only parts of the embodiments instead of all of the embodiments. Other embodiments can be obtained by a skilled person in the art without creative effort fall in the protected scope of the present disclosure.

DETAILED DESCRIPTION OF PREFERRED EMBODIMENTS

Please refer to the drawings, the same component number represent the same components. The following description is based on the exemplified specific embodiments of the present disclosure, which should not be viewed as limiting other specific embodiments that are not detailed here.

It should be noted that a bendable supporting structure of the present disclosure embodiment may be used for display technology, such as a mobile phone, a tablet computer, or a television, and may also be used in other technical fields, such as a foldable circuit board.

Figure 1:
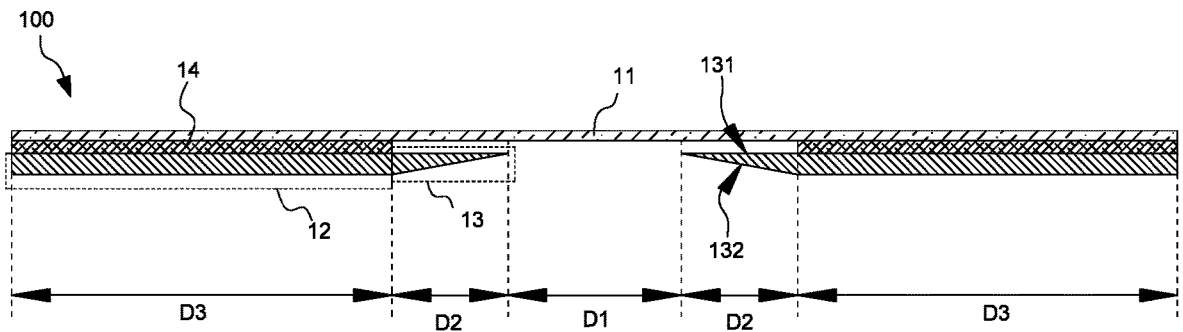
FIG. 1 illustrates a cross-sectional structure of a bendable supporting structure which is in a flat situation of the embodiment of the present disclosure.
Figure 2:
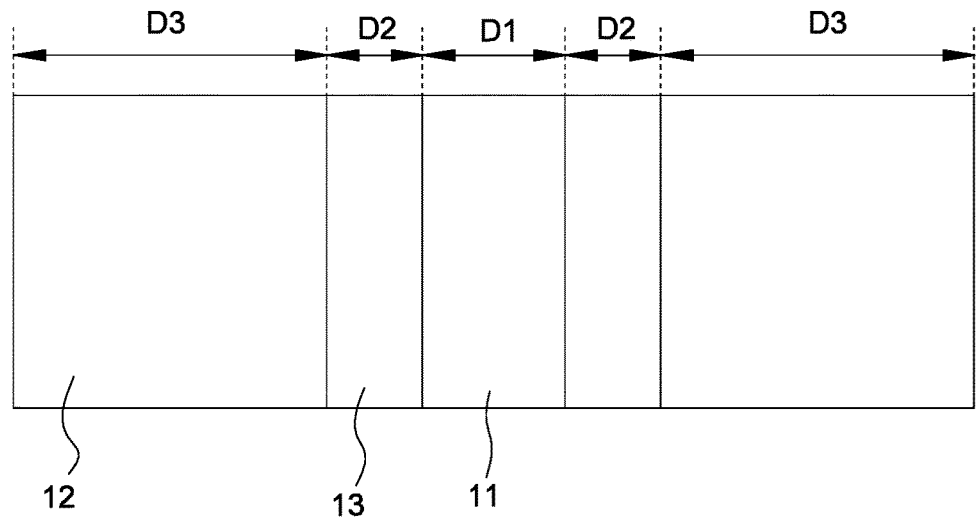
FIG. 2 illustrates bottom view of the structure of the bendable supporting structure of the embodiment of the present disclosure.

Please refer to FIG. 1 which illustrates a cross-sectional structure of a bendable supporting structure which is in a flat situation of the embodiment of the present disclosure. FIG. 2 illustrates bottom view of the structure of the bendable supporting structure of the embodiment of the present disclosure.

The present disclosure embodiment provides a bendable supporting structure 100, which includes a flexible substrate 11, a first supporting unit 12, a second supporting unit 13, and an adhesive layer 14. The flexible substrate 11 is used to dispose an object to be bent that is disposed externally.

The side of the flexible substrate 11 facing away from the object to be bent includes a bendable region D1, two transition regions D2, and two non-bendable regions D3. Two non-bendable regions D3 are located on both sides of the bendable region D1. The bendable region D1 is connected to each of the non-bendable region D3 through one of the transition regions D2. The first supporting unit 12 is fixedly disposed on each non-bendable region D3. The second supporting unit 13 is provided on each of the transition regions D2. The second supporting unit 13 is connected to the first supporting unit 12. The first supporting unit 12 is fixedly connected to the flexible substrate 11 through the adhesive layer 14.

A thickness of the second supporting unit 13 decreases from an end near the non-bendable region D3 to an end near the bendable region D1.

A thickness of the second supporting unit 13 of the bendable supporting structure 100 of the present disclosure, decreases from the end near the first supporting unit 12 to the end near the bendable region D1. The benefit of the present disclosure is that a standard waterdrop-like structure is smoothly formed between the bendable region D1 and the transition region D2 when bending the flexible substrate 11 and the object to be bent externally provided on the flexible substrate 11. Stress concentration and transition out of synchrony caused by the object to be bent and the flexible substrate 11 at the step difference between the first supporting unit 12 and the flexible substrate 11 during bending are prevented.

In the bendable supporting structure 100 of the present disclosure, the thickness of the second supporting unit 13 decreases from the end near the first supporting unit 12 to the end near the bendable region D1. Because the second supporting unit 13 is gradually thinner in the transition region D2, the stiffness and rigidity of the second supporting unit 13 are certainly weakened so that the second supporting unit 13 will endure adaptive deformation under external forces. For example, please refer to FIG. 3, when the flexible substrate 11 is in a bent state, both sides of a bending structure of the flexible substrate 11 bending structure are attached and squeezed onto the second supporting unit 13 at the transition region D2. The second supporting unit 13 endures the bending stress of the bending structure and deforms to open outwardly. The thinner part is squeezed for even greater distance, so parts of the flexible substrate 11, corresponding to the transition region D2 and the bendable region D1, can be smoothly supported by the second supporting unit 13 to smoothly form a waterdrop-like bending structure during the bending process, thereby protecting the flexible substrate 11.

More specifically, the second supporting unit 13 includes a first surface 131 facing the flexible substrate 11 and a second surface 132 facing away from the flexible substrate 11. In a flat state, the plane on which the flexible substrate 11 is located is views as a reference plane, the first surface 131 is parallel to the reference surface, and the height of the second surface 132 decreases from the end near the non-bendable region D3 to the end near the bendable region D1.

The first surface 11 is parallel to the plane on which the flexible substrate 11 is located, so that the distance between the second supporting unit 13 and the flexible substrate 11 is the shortest. When an external object, such as a finger, presses the flexible substrate 11 corresponding to the transition segments D2 or the object to be bent that is disposed externally, it is convenient for the second supporting unit 13 to quickly support the flexible substrate 11 so that the pressing experience is improved.

The second surface 132 is an inclined surface. The setting of the second surface 132 as an inclined surface makes the connection between the first supporting unit 12 and the second supporting unit 13 smoother. The inclined surface makes the second surface 132 support the bending performance of the object to be bent or the flexible substrate 11, so that the portions of the flexible substrate 11 corresponding to the transition region D2 and the bendable region D1 smoothly form a drop-like bending structure during the bending process. In some embodiments, the second surface 132 may also be a concave surface or a convex surface. The arrangement of the concave surface is more suitable for the flexible substrate to form a waterdrop-like structure when bending, and the flexible substrate 11 is prevented from suffering larger reaction force of the second surface 132 when folded.

Further, the second supporting unit 13 is fixedly connected to the first supporting unit 12. The second supporting unit 13 is suspended. The suspended arrangement of the second supporting unit 13 improves the movement of the second supporting unit 13, that is, when the second supporting unit 13 is squeezed by an external force, the second supporting unit 13 rapidly deforms outwardly, which is beneficial to the second supporting unit 13 to be quickly opened. Thus, the bending structure of the flexible substrate 11 naturally forms a waterdrop shape.

Figure 3:
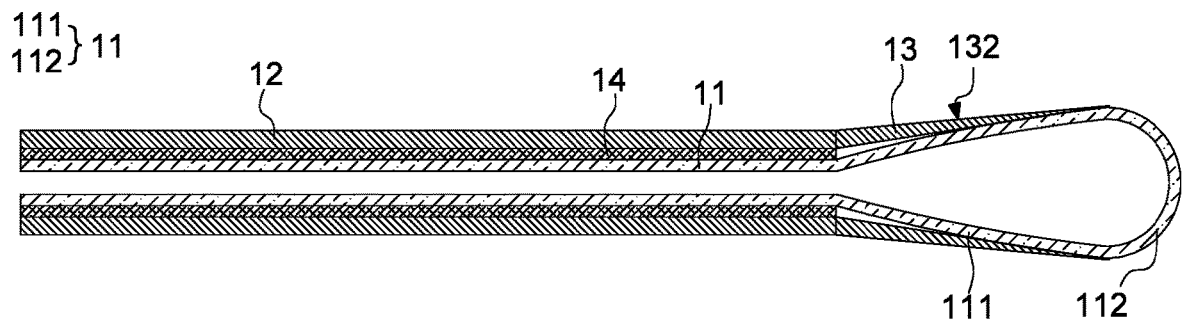
FIG. 3 illustrates a cross-sectional structure of the bendable supporting structure which is in a bent situation of the embodiment of the present disclosure.

For example, referring to FIG. 3, in the bendable supporting structure 100 of the present disclosure, when the supporting structure 100 is bent, the flexible substrate 11 forms a drop-like bending structure 20 at the transition region D2 and the bendable region D1. The bending structure 20 includes the transition segments 111 attached to the first surface 131 and the arc segments 112 connected between the transition segments 111. When the flexible substrate 11 is in a flat state, the transition segments 111 and the arc segment 112 are also in a flat state and are suspended.

When the flexible substrate 11 is in a bent state, the transition segments 111 are attached to the second supporting unit 13 at the transition region D2. When the flexible substrate 11 forms the bending structure 20, the bending structure 20 has an outward stress, which makes the bending structure 20 pushes against the second supporting unit 13, and the second supporting unit 13 is outwardly deformed by the force. In other words, the second supporting unit 13 produces an effect of opening outwardly opens under force and releases part of the stress generated by the bending structure 20, thereby the flexible substrate 11 is protected.

Further, a length of the second supporting unit 13 is less than or equal to a length of the transition segments 111 to avoid waste of materials. Selectively, the length of the second supporting unit 13 is equal to the length of the transition segments 111.

In the bendable supporting structure 100 of the present disclosure, a thickness of the flexible substrate 11 is less than a thickness of the first supporting unit 12. The thickness of the flexible substrate 11 is designed to be less, so that the flexible substrate 11 has better bending performance. The thickness of the first supporting unit 12 is designed to be greater, so that the first supporting unit 12 has better stiffness and supporting performance.

Specifically, the thickness of the flexible substrate 11 is 20 micrometers to 50 micrometers. The thickness of the first supporting unit 12 is 8 to 10 times the thickness of the flexible substrate 11. Optionally, the flexible substrate 11 is 0.03 mm, and the first supporting unit 12 is 0.3 mm.

Selectively, the flexible substrate 11 is made of one of metal selected from stainless steel, amorphous metal, and spring steel. Materials of the first supporting unit 12 and the second supporting unit 13 is also one of metal selected from stainless steel, amorphous metal, or spring steel. The materials of the first supporting unit 12 and the second supporting unit 13 may be the same or different. In this embodiment, the first supporting unit 12 and the second supporting unit 13 are integrally formed. Obviously, the first supporting unit 12 and the second supporting unit 13 can also be fixedly connected as two individual components.

The object to be bent can quickly return to a flat state, ripples can be reduced, and stiffness is improved due to the good strength and stiffness of metal materials and amorphous metal materials.

In addition, the flexible substrate 11 and the first supporting unit 12 can be adhered by double-sided tape or optical glue, combined by dispensing, integrated by nano injection molding, or integrated by etching.

The process of forming the supporting structure 100 is: first, providing the flexible substrate 11 and a support plate, grinding parts of the support plate close to the transition region D2 to form an inclined surface, the second supporting unit 13, wherein unground part is the first supporting unit 12, then the adhesive layer 14 is coated on the first supporting unit 12, and finally, the flexible substrate 11 is attached and adhered to the adhesive layer 14. The forming process of the supporting structure of this embodiment is completed.

Obviously, the supporting structure 100 can also be directly etched to the part of the support plate corresponding to the transition region D2, so that the part forms the second supporting unit 13 with a thinner structure to achieve the integration of the first supporting unit 12 and the second of supporting unit 13.

In addition, the transition region can be coated with UV curing adhesive and UV curing can be performed while coating. Because the UV curing adhesive is a liquid, the UV curing adhesive will automatically flow to the bendable region D3 and is gradually thinning. Then, by controlling the amount of UV curing adhesive, the thickness of the bendable region D3 gradually becomes zero.

Figure 4:
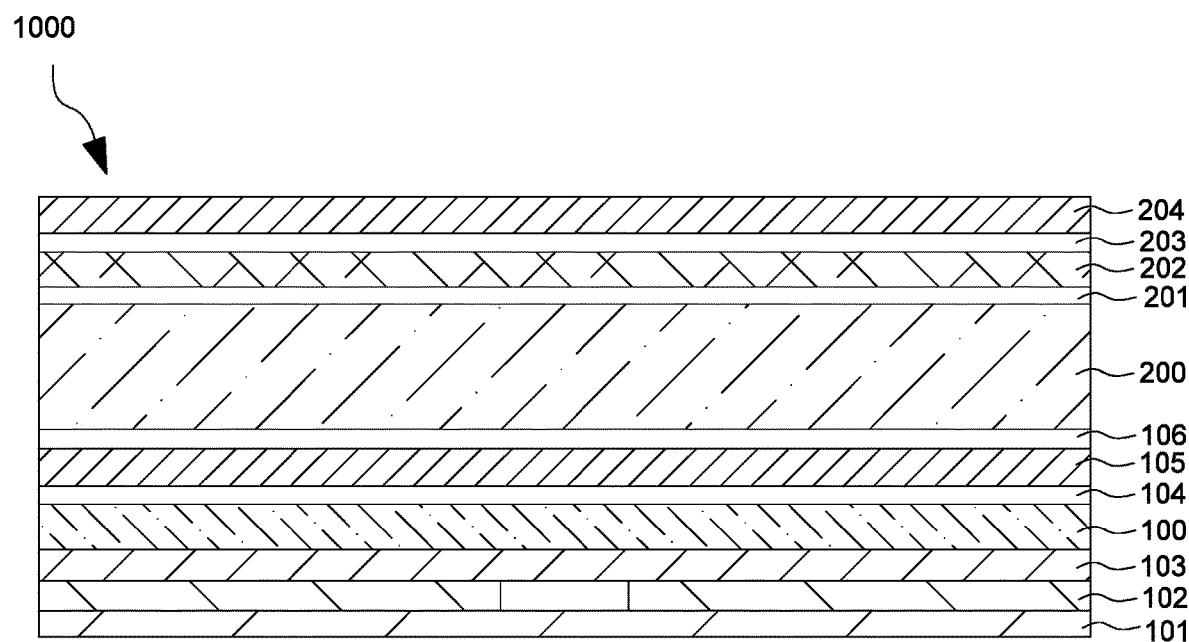
FIG. 4 illustrates the structure of a display device of the embodiment of the present disclosure.

Please refer to FIG. 4, which is a schematic structural diagram of a display device according to an embodiment of the present disclosure. The embodiment of the present disclosure also relates to a display device 1000 which includes a flexible display panel 200 and the bendable supporting structure 100 of the above embodiment. The flexible display panel 200 is fixedly disposed on the flexible substrate of the supporting structure 100.

The specific structure of the bendable supporting structure 100 is the same as or similar to the structure of the bendable supporting structure 100 of the above embodiment. For specific description, please refer to the illustration of the above embodiment, and details are not described herein again.

The display device 1000 includes, from bottom to top in sequence, a bottom frame 101, a power supply structure layer 102, a heat dissipation layer 103, a supporting structure 100, a first adhesive layer 104, a back plate 105, a second adhesive layer 106, a flexible display panel 200, a third adhesive layer 201, a polarizer 202, a fourth adhesive layer 203, and a cover plate 204.

The benefit of the bendable supporting structure in the present disclosure is it forms a standard waterdrop-like structure between the bendable region and the transition region when bending the flexible substrate and the object to be bent externally provided on the flexible substrate by setting the thickness of the second supporting unit. Stress concentration and transition out of synchrony caused by the object to be bent and the flexible substrate at the step difference between the first supporting unit and the flexible substrate during bending are prevented.

To conclude, for a skilled person in the part, variations or modifications obtained corresponding to the technical solutions and technical aspects of the present disclosure fall in the protected scope define by the claims.

What is claimed is:

1. A bendable supporting structure, comprising:
    a flexible substrate, wherein an object to be bent is externally disposed on the flexible substrate, one side of the flexible substrate facing away from the object to be bent comprises a bendable region, two transition regions, and two non-bendable regions, the two non-bendable regions are disposed on opposite sides of the bendable region, and the bendable region is connected to each of the non-bendable regions through one of the transition regions;
    first supporting units fixedly disposed on each of the non-bendable regions; and
    second supporting units disposed on each of the transition regions and connected to the first supporting units;
    wherein thicknesses of the second supporting units gradually decreases from an end close to the non-bendable regions to an end close to the bendable region;
    wherein the first supporting units are connected to the flexible substrate through an adhesive layer; the second supporting units are fixedly connected to the first supporting units, and the second supporting units are suspended above the transition regions.

2. The bendable supporting structure according to claim 1, wherein the second supporting units comprise a first surface toward to the flexible substrate and a second surface away from the flexible substrate;
    wherein in a flat condition, a plane where the flexible substrate is located is a reference plane, the first surface is parallel to the reference plane and a height of the second surface gradually declines from the end close to the non-bendable region to the end close to the bendable region.

3. The bendable supporting structure according to claim 2, wherein the second surface is an inclined surface.

4. The bendable supporting structure according to claim 1, wherein when the bendable supporting structure is bent, the flexible substrate forms and shapes a bending structure into a waterdrop shape at the transition regions and the bendable region, wherein the bending structure comprises transition segments corresponding to the second supporting units and an arc segment connected between the transition segments, and a length of the second supporting units is less than or equal to a length of the transition segments.

5. The bendable supporting structure according to claim 1, wherein a thickness of the flexible substrate is less than a thickness of the first supporting unit.

6. The bendable supporting structure according to claim 5, wherein the thickness of the flexible substrate is 20 microns to 50 microns, and a thickness of the first supporting units is 8 to 10 times the thickness of the flexible substrate.

7. The bendable supporting structure according to claim 1, wherein the first supporting units and the second supporting units are integrally formed.

8. The bendable supporting structure according to claim 1, wherein a material of the flexible substrate is selected from one of stainless steel, amorphous metal, or spring steel sheet.

9. A display device comprising a flexible display panel and a bendable supporting structure, wherein the flexible display panel is fixedly disposed on the bendable supporting structure, and the bendable supporting structure comprises:
    a flexible substrate, wherein an object to be bent is externally disposed on the flexible substrate, one side of the flexible substrate facing away from the object to be bent comprises a bendable region, two transition regions, and two non-bendable regions, the two of the non-bendable regions are disposed on opposite sides of the bendable region, and the bendable regions is connected to each of the non-bendable regions through one of the transition regions;
    first supporting units fixedly disposed on each of the non-bendable regions; and
    second supporting units disposed on each of the transition regions and connected to the first supporting units;
    wherein thicknesses of the second supporting units gradually decrease from an end close to the non-bendable regions to an end close to the bendable regions;
    wherein the first supporting units are connected to the flexible substrate through an adhesive layer; the second supporting units are fixedly connected to the first supporting units, and the second supporting units are suspended above the transition regions.

10. The display device according to claim 9, wherein the second supporting unit comprises a first surface toward to the flexible substrate and a second surface away from the flexible substrate;
    wherein in a flat condition, a plane where the flexible substrate is located is a reference plane, the first surface is parallel to the reference plane and a height of the second surface gradually declines from the end close to the non-bendable region to the end close to the bendable region.

11. The display device according to claim 9, wherein when the bendable supporting structure is bent, the flexible substrate forms and shapes a bending structure into a waterdrop shape at the transition regions and the bendable regions, wherein the bending structure comprises transition segments corresponding to the second supporting units and an arc segment connected between the transition segments, and a length of the second supporting units is less than or equal to a length of the transition segments.

12. The display device according to claim 10, wherein the second surface is an inclined surface.

13. The display device according to claim 9, wherein a thickness of the flexible substrate is less than a thickness of the first supporting unit.

14. The display device according to claim 13, wherein the thickness of the flexible substrate is 20 microns to 50 microns, and a thickness of the first supporting unit is 8 to 10 times the thickness of the flexible substrate.

15. The display device according to claim 9, wherein the first supporting unit and the second supporting unit are integrally formed.

16. The display device according to claim 9, wherein a material of the flexible substrate is selected from one of stainless steel, amorphous metal, or spring steel sheet.

* * * * *